United States Patent [19]

Everhart et al.

[11] Patent Number: 5,023,217

[45] Date of Patent: Jun. 11, 1991

[54] CERAMIC BODIES FORMED FROM PARTIALLY STABILIZED ZIRCONIA

[75] Inventors: Richard Everhart; Paul Bosomworth; Kenneth Butcher; Matthias Hoffmann, all of Hendersonville, N.C.

[73] Assignee: Swiss Aluminum Ltd., Chippis, Switzerland

[21] Appl. No.: 468,184

[22] Filed: Jan. 22, 1990

Related U.S. Application Data

[62] Division of Ser. No. 408,739, Sep. 18, 1989, Pat. No. 4,923,830.

[51] Int. Cl.$^5$ .................. C04B 35/48; C04B 38/00
[52] U.S. Cl. .................. 501/103; 501/80; 501/102
[58] Field of Search .......... 264/43, 44; 501/102, 501/103, 39, 80; 35/48, 49; 423/266, 608

[56] References Cited

U.S. PATENT DOCUMENTS

| | | | |
|---|---|---|---|
| 4,035,191 | 7/1977 | Johns | 501/103 |
| 4,568,595 | 2/1986 | Morris | 264/44 |
| 4,690,910 | 9/1987 | Tsukuma et al. | 501/103 |
| 4,703,024 | 10/1987 | Aronov | 501/103 |
| 4,789,651 | 12/1988 | Sugie et al. | 501/103 |
| 4,885,266 | 12/1989 | Hughan et al. | 423/266 |

FOREIGN PATENT DOCUMENTS

| | | | |
|---|---|---|---|
| 0014473 | 2/1981 | Japan | 501/105 |
| 0152266 | 8/1984 | Japan | 501/103 |

OTHER PUBLICATIONS

Dialog Abstract-"Ceramics Filter for Filtering Molten Metal", JP 62269724(A) (11/24/87).
*Modern Ceramic Engineering*, Properties Processing & Use in Design, David Richerson (1982), pp. 18–19.

*Primary Examiner*—William R. Dixon, Jr.
*Assistant Examiner*—Paul Marcantoni
*Attorney, Agent, or Firm*—Bachman & LaPointe

[57] ABSTRACT

The present invention relates to ceramic bodies suitable for use in high temperature applications such as molten metal filters and kiln furniture. The ceramic bodies are formed from partially stabilized zirconia and are characterized by the presence of from about 12% to about 80% by weight zirconia in a monoclinic phase and the balance essentially in a cubic phase at room temperature. The ceramic bodies possess an excellent combination of physical properties including high temperature strength and thermal shock resistance. The invention also relates to the process for forming the ceramic bodies and the thixotropic ceramic slurry used therein.

5 Claims, No Drawings

CERAMIC BODIES FORMED FROM PARTIALLY STABILIZED ZIRCONIA

This is a Division, of U. S. Pat. No. 4,923,830 application Ser. No. 408,739 filed Sept. 18, 1989.

The present invention relates to ceramic bodies formed from partially stabilized zirconia having particular utility as high temperature filters for molten metal, kiln furniture and high temperature catalyst carriers.

Ceramic materials are used in high temperature applications because of their excellent thermal and mechanical properties. Filters for use in molten metal filtration applications are typically produced by a replication process which in its most basic form comprises immersing a porous combustible foam material in a thixotropic ceramic slurry and firing the impregnated foam material to burn off the foam material and produce a porous ceramic body. U.S. Pat. Nos. 3,947,363 to Pryor et.al., 4,024,212, to Dore et.al., 4,265,659 to Blome, 4,391,918 to Brockmeyer, and 4,610,832 to Brockmeyer illustrate replication processes forming ceramic foam filters. These patents also illustrate the various types of ceramic materials employed in forming the filters.

The Pryor et.al. patent for example utilizes a slurry containing alumina, chromia, kaolin, bentonite and colloidal aluminum orthophosphate to form the filter body. The Pryor et.al. patent also states that materials such as mullite, zirconia, magnesia and the like may be employed in addition to the alumina and/or chromia components or in substitution therefor to achieve particular properties. The Dore et.al. and Blome patents also mention that the thixotropic ceramic slurries used to form ceramic filters may include a wide variety of ceramic materials such as alumina, chromia, zirconia, magnesia, titania, and silica.

U.S. Pat. No. 4,760,038 to Kinney, Jr. et.al. relates to a ceramic composition having enhanced thermal shock resistance and resistance to high temperature degradation. The ceramic composition has alumina as a principal ingredient and controlled additives of one or more of zirconia, titania, or maganese oxide.

High temperature applications such as kiln furniture and foundry applications require the use of ceramic material possessing certain combinations of physical properties. For example, in kiln furniture applications, the ceramic material must be substantially chemically inert with such wares as electronic components containing lead based titanates. The ceramic material must also tolerate many high temperatures cycles up to 1250°–1480° C. and even as high as 1870° C. Still further, it must have a low thermal mass for faster firing and energy saving. In foundry applications, the ceramic must tolerate a very severe temperature up-cycle such as 1090°–1540° C. in 5 seconds. The ceramic material must also have a relatively high purity and relatively high permeability (10 ppi, vertical cut foam required) as well as be chemically inert with the metal alloys being processed.

Zirconia is a ceramic material which lends itself to such high temperature applications because of its excellent mechanical, thermal and chemical properties. Unfortunately, it is a difficult material to work with because in an unstabilized form, it goes through several phase changes when exposed to high temperatures. At room temperature, unstabilized zirconia is monoclinic. As it is heated to a temperature in the range of 1000° C. to 1200° C., it undergoes a phase change to a tetragonal structure. At higher temperatures, on the order of approximately 2000° C., it undergoes yet another phase transformation to a cubic structure. When it cools down, the zirconia goes back through the phase transformations. Potentially detrimental volume changes occur during these phase transformations. For example, zirconia contracts when it goes from the monoclinic to the tetragonal phase and expands during the reverse phase change. It has been found that zirconia can be a viable ceramic material for high temperature applications only if the amount of zirconia which goes through these phase transformations is strictly controlled.

Accordingly, it is an object of the present invention to provide a ceramic body formed from zirconia which is suitable for use in high temperature applications.

It is a further object of the present invention to provide a ceramic body as above which exhibits excellent thermal shock resistance and high temperature strength properties.

It is still a further object of the present invention to provide a ceramic body formed from partially stabilized zirconia.

It is yet a further object of the present invention to provide a process for forming the above ceramic body.

These and other objects and advantages will become clearer from the following description.

SUMMARY OF THE INVENTION

The foregoing objects and advantages are obtained by forming a ceramic body comprising partially stabilized zirconia starting from a thixotropic slurry containing monoclinic zirconia. Partially stabilized zirconia has been found to be a particularly desirable and useful ceramic material for high temperature applications because it has the ability to tolerate severe thermal cycling. Further, it has the advantage of being chemically inert with most ceramic wares being fired in the electronics industry. Still further, the mechanical properties of this form of zirconia can be tailored and controlled over a wide range to suit most foundry and kiln furniture applications.

The thermal shock resistance properties of zirconia stem from the aforementioned phase changes which occur during heating and cooling. The present invention takes advantage of the discovery that the cubic phase of zirconia can be formed at temperature well below 2370° C. by adding a material which serves as a source of stabilization for zirconia as well as a green binder.

Useful stabilizers have been found to include magnesia, calcia, ceria, titania, and mixtures thereof. These stabilizers dissolve significantly in a zirconia phase at temperatures above about 1500° C. They maintain a cubic phase in the zirconia at temperatures well below 2370° C. Magnesia and calcia are preferred because of their relatively low cost.

Ceramic bodies suitable for use in high temperature applications are formed in accordance with the present invention by: preparing an aqueous thixotropic slurry having a solids content consisting essentially of from about 30% to about 98% by weight monoclinic zirconia, from about 0.5% to about 5% by weight of one of the aforementioned stabilizing materials and up to about 8.5% by weight of a binder material; impregnating a porous body with the slurry; drying the impregnated body; and firing the impregnated body at a temperature in the range of from about 1500° C. to about 1700° C. During firing, the zirconia is at least partially stabilized and the underlying organic forming the porous body is driven off or volatilized.

Ceramic bodies produced in accordance with the present invention are characterized by the presence of from about 12% to about 80% by weight zirconia in a monoclinic Phase and the balance essentially in a cubic phase at room temperature. As a result of this combination of phases, the amount of zirconia which undergoes phase transformation during high temperature applications is carefully controlled. The ceramic bodies of the present invention exhibit an excellent combination of high temperature properties including strength and thermal shock resistance and are quite suitable for use in such applications, as molten metal filter, kiln furniture, and high temperature catalyst carriers.

The following detailed description will further describe the novel ceramic bodies of the present invention and the manner in which they are formed. Unless otherwise stated, all percentages are weight percentages.

DETAILED DESCRIPTION

Ceramic bodies formed in accordance with the present invention may be used in a variety of high temperature applications because of their favorable combination of properties. For example, they may be used as molten metal filters because they can withstand the elevated temperatures associated with such uses, while being chemically inert with respect to the molten metal being filtered. They can be used in other foundry applications. Still further, they can be used as kiln furniture.

Ceramic bodies in accordance with the present invention are formed by partially stabilized zirconia because of its ability to tolerate severe thermal cycling and because of its chemical inertness with most ceramic wares being fired in the electronics industry. In addition, the mechanical properties of zirconia can be tailored and controlled over a wide range to suit many high temperature applications.

The ceramic bodies of the present invention are formed by first preparing an aqueous thixotropic slurry having a solids content consisting essentially of from about 30% to about 98%, preferably from about 60% to about 98%, monoclinic zirconia, from about 0.5% to about 5.0%, preferably from about 2.0% to about 5.0%, of a material which stabilizes zirconia in situ while also acting as a green binder, and up to about 8.5% of a binder material. One of the novel aspects of the present invention is the use of monoclinic zirconia as a starting material. Most zirconia based ceramic bodies are formed using cubic zirconia as the starting material.

While it is preferred to use monoclinic zirconia alone in preparing the slurry, one could also use a combination of monoclinic zirconia and prestabilized zirconia such as calcia—or magnesia—stabilized zirconia.

It is desirable to have at least 20% of the zirconia in the slurry having a median particle size less than about 1 um. Such fine grained particles assist in the sintering of the body at temperatures in the range of from about 1500° C. to about 1700° C. It is also desirable that the remaining zirconia have a median particle size in the range from about 1 um to about 50 um. These larger grain sized particles assist reducing the amount of shrinkage which occurs during processing.

Suitable stabilizing materials for use in the slurry include, but are not limited to a material selected from the group consisting of magnesia, ceria, calcia, titania, and mixtures thereof. These materials are useful because they dissolve in zirconia at temperatures above about 1500° C. and enable the cubic phase to be formed in the zirconia particles at temperatures well below 2370° C. For example, 5% magnesia additions are almost sufficient to fully stabilize zirconia at 1600° C. One can control the amount of cubic phase in the final ceramic body by controlling the amount of stabilizer added to the slurry. Magnesia and calcia are preferred stabilizing materials because of their relatively low cost.

The binder material may constitute a material selected from the group consisting of an acetate, a starch, a gum, or mixtures thereof. A suitable starch material may be methyl cellulose while a suitable gum may be Xanthum gum. The preferred binder material however is magnesium acetate. This is because during calcination magnesium acetate decomposes to magnesium oxide, goes into solid solution in the zirconia, and stabilizes a portion of the zirconia in the cubic phase. It also reduces the amount of stabilizing material which has to be added to the slurry to form the desired cubic phase in final product. As can be seen from the foregoing, magnesium acetate serves the dual purpose of being a source of stabilizing material (MgO) and a green binder.

The slurry can be prepared in the following manner. The various blending and mixing steps can be performed using a high shear mixer, model RV02, supplied by Eirich of Canada; a bread mixer, model N50, supplied by Hobart of Troy, OH; and/or any other suitable mixer known in the art.

The binder material is first predissolved or dispersed in water at a temperature in the range of from about 20° C. to 90° C. and mixed using the Hobart mixer for up to 5 minutes. Where the binder material is magnesium acetate, it is desirable for the water to be at a temperature in the range of from about 70° C. to 90° C.

The monoclinic zirconia is dry blended with the stabilizing material using the Eirich mixer. Mixing time here may also be up to about 5 minutes. If desired, more than one source of monoclinic zirconia may be blended with the stabilizer. For example, the zirconia may be a 50/50 mixture of a fine grade material such as "SC 15" grade, white firing monoclinic zirconia produced by Magnesium Elektron Inc. and a coarser "S" grade also produced by Magnesium Elektron, Inc. The stabilizing material blended with the zirconia may be a fine grained reactive grade magnesia sold under the name "Magchem 40" by Martin Marietta Chemicals.

After dry blending has been completed, the aqueous solution containing the dispersed binder is added to the zirconia and stabilizing material. The resulting solution is then mixed for a time period in the range of from about 1 minute to about 30 minutes. It is possible during mixing for air to become entrained in the slurry If this occurs, the slurry can be de-aired in any suitable manner.

It has been found that slurries formed in accordance with the present invention have a dynamic viscosity in the range of from about 20,000 centipoise to about 40,000 centipoise as measured at 20 r.p.m. on a Haake viscosimeter, RV3 model, 30 mm. dia. cup size. In addition, they are thixotropic in rheology and exhibit some evidence of a yield stress.

After the slurry has been prepared, a flexible, porous, organic substrate body such as a polyurethane foam is impregnated with the aqueous ceramic slurry so that fiber-like webs are coated therewith and the voids, are filled therewith. If desired, a flocking may be applied to the substrate prior to impregnation. It has been found that flocking helps the slurry adhere to the underlying foam substrate. Normally, it is preferred to impregnate the substrate by simply immersing it in the slurry for a short period of time sufficient to insure complete impregnation of the substrate.

The impregnated foam is then compressed to expel a portion of the slurry while leaving the fiber-like web portion coated therewith and with a plurality of blocked pores throughout the body, i.e. homogeneously distributed throughout the ceramic body rather than grouped together. In a continuous operation, one may pass the impregnated foam through a preset roller to effect the desired expulsion of slurry from the foam and leave the desired amount impregnated therein. Naturally, this may be done manually by simply squeezing the flexible foam material to the desired extent. At this stage, the foam is still flexible and may be formed into a desired configuration.

The impregnated foam is then dried by any suitable means, such as air drying, accelerated drying at a temperature of from 100° to 700° C. for from 15 minutes to 6 hours, or by microwave drying. Air drying may be achieved in from 8 to 24 hours.

After drying, the material is heated at an elevated temperature, preferably from about 1500° C. to about 1700° C., to sinter the ceramic coating on the fiber-like webs. Suitable heating times are in the range of from about 15 minutes to about 10 hours.

During this heating step, the organics in the substrate are driven off or volatilized and the zirconia becomes partially stabilized. The resulting ceramic bodies are characterized by the present of from about 12% to about 80% zirconia in a monoclinic phase and the balance of the zirconia essentially in a cubic phase at room temperature. They are also characterized by an open cell structure having a plurality of interconnected voids surrounded by a web of said zirconia.

Of course, the amount of monoclinic and cubic phases in the final product may be tailored for different applications. For example, ceramic bodies characterized by from about 12% to about 28% monoclinic phase have particular utility in kiln furniture applications. As previously discussed, the amount of monoclinic phase in the final product can be controlled by adjusting the stabilizer and/or binder content of the slurry.

It has also been found that the size of a ceramic body will govern the maximum achievable thermal shock resistance. Small bodies can be made with a high monoclinic fraction and hence a high thermal shock resistance, whereas large pieces require a lower monoclinic fraction to prevent cracking and therefore have a lower shock resistance. Thus, for foundry application, filters are typically less than 4" in size while having a monoclinic fraction in the range of from about 30% to about 80%. Such filters have been found to have a relatively high thermal shock resistance and excellent high temperature strength properties.

In accordance with the present invention, the specific features thereof will be more readily understandable from a consideration of the following data.

EXAMPLE I

Two thixotropic slurries were prepared in the following manner. The first slurry (slurry A) was prepared by dispersing 548 grams of magnesium acetate in 1115 grams of water at a temperature of 80° C. and mixing the solution in a Hobart mixer for 5 minutes. 5000 grams of monoclinic zirconia consisting mainly of "SC 15" grade having a median particle size of 0.6 um as measured on a sedigraph was dry blended with 52 grams of magnesia sold under the name Mag Chem 40 using an Eirich mixer. Blending took place for 5 minutes. Thereafter the aqueous solution containing the dispersed magnesium acetate was added to the dry blended zirconia and magnesia stabilizer. The resulting slurry was than mixed for 5 minutes using an Eirich mixer having a pan and agitator set at speed 1. The speed pan and agitator were then set at speed 2 and mixing took place for another 25 minutes. The agitator was then turned off and the pan set to speed 1 for 5 minutes to de-air the slurry. Slurry A was determined to have a composition by weight of 74.5% monoclinic zirconia, 0.8% magnesia, 8.2% magnesium acetate and the balance water.

The second slurry (Slurry B) was prepared in the same manner with the following exceptions (1) 700 grams of water at 80° C. was added to 550 grams of magnesium acetate; and (2) 2500 grams of "SC15" grade monoclinic zirconia were dry blended with 2500 grams of grade "S" monoclinic zirconia and 50 grams of magnesia. Slurry B was determined to have a composition by weight of 79.4% monoclinic zirconia, 0.8% magnesia, 8.7% magnesium acetate and the balance water.

A 4×4×1 inch piece of polyurethane foam was immersed in each slurry. Excess slurry was removed by passing each sample through a set of rollers. The impreganted sample were then dried at 125° C. for 8 hours. Following drying, the impregnated samples were fired at a temperature of 1550° C. for 3 hours.

Table I presented below shown the properties of the resulting ceramic bodies.

TABLE I

|  | Slurry A | Slurry B |
| --- | --- | --- |
| Lin. Firing Shrinkage (%) | 18.1 (3.4%) | 12.5 |
| Slurry Solids content (%) | 75.3 | 81.8 |
| Slurry Dynamic Viscosity (cP) | 20–40000 | 20–40000 |
| Slurry Dynamic viscosity (PaS) | 20–40 | 20–40 |
| COE 0–1000° C. (MK-1) | 9.6 | 9.6 |
| Theoretical Density (gml-l) | 5.67 | 5.67 |
| Bulk Density (gml-l) | 1.02 | 1.02 |
| Relative density (%) | 18.0 | 18.0 |
| Stabilizer (MgO %) | 3.0 | 3.0 |
| Monoclinic content (%) | 57 | 57 |
| Cubic content (%) | 43 | 43 |
| Firing temperature (°C.) | 1550 | 1550 |
| MOR3pt-room temp. (psi) | 183(43%) | 313(20%) |
| MOR3pt-room temp. (MPa) | 1.3 | 2.2 |
| MOR3pt-1527–1566° C. (psi) | — | 154(27%) |
| MOR3pt-1527–1556° C. (MPa) | — | 1.1 |

The numbers in parentheses refers to the standard deviation, expressed as the percent of the mean values.

All samples had good thermal shock resistance.

EXAMPLE II

For comparison purposes, a ceramic body was formed using a starting material of mostly prestabilized zirconia. Table II below identifies the quantity of materials used to form the slurry and the slurry composition.

TABLE II

|  | % by weight | Typical batch |
| --- | --- | --- |
| Prestabilized Zirconia | 79.4 | 5000 g |
| magnesium Acetate | 9.5 | 600 g |
| water | 11.1 | 700 g |

The slurry was prepared in the following manner:

The magnesium acetate was dissolved in the water while mixing with a Fisher stirrer. The acetate solution was then added to an attribution mill or attritor loaded with 3/16" zirconia balls. The prestabilized zirconia was then added to the acetate solution and mixed in the attritor for 30 mins. at speed 3.

A piece of polyurethane foam was immersed in the slurry and processed as in example I. Firing took place at a temperature of 1550° C. for 3 hours. The resulting ceramic body had a 5% monoclinic zirconia phase and a 95% cubic zirconia phase and poor shock resistance.

Example III

Another series of tests were conducted using slurries (C and D) which were calcia/magnesia stabilized zirconia formulations. Both slurries contained magnesium acetate as a binder. Each slurry was also made up of a mixture of monoclinic zirconia and calcia pre-stabilized zirconia (TAM Zirox CS-25).

Table III shows the composition of the two slurries.

TABLE III

| Slurry C | Slurry D |
|---|---|
| 58.8% TAM CS-325 | 42% TAM CS-325 |
| 25.2% monoclinic zirconia | 42% monoclinic zirconia |
| 10.1% water | 10.1% water |
| 5.9% mg-acetate | 5.9% mg-acetate |

The slurries were prepared as follows:

1. Combine the Mg-acetate with the water and mix for 15 minutes in a Hobart mixer or until completely dissolved.
2. Meanwhile mix the dry ingredients for 5 minutes in an Eirich mixer at normal speed.
3. Add the mg-acetate solution to the dry mix.
4. Mix in Eirich mixer for 15 minutes. (Normal rotor speed)
5. After mixing is complete, turn the rotor off, but let the pan remain revolving for 5 minutes in order to help de-air the slurry.

Thereafter, 4×4×1 inch polyurethane foam samples were impregnated to 18-25% density and dried using a microwave dryer. The impregnated foam samples were fired at 1570° C. for approximately 3 hours. The physical properties of the bodies are reported in Table IV.

| | % monocl | % cubic | MOR psi | DENSITY fired piece | THERMAL SHOCK |
|---|---|---|---|---|---|
| Slurry C | 20 | 80 | 240 | 1.01 g/cm³ | moderate |
| Slurry D | 40 | 60 | 208 | 0.79 g/cm³ | good |

Example IV

Further tests were conducted to determine optimum properties for kiln furniture applications. These tests consisted of forming two slurries similar to Slurry C. The only difference was that one contained 6.5% by weight magnesium acetate and the other contained 3.5% by weight magnesium acetate.

The samples were prepared as in Example III. They were then tested as pusher plates in a pusher plate kiln. In this type of application, the most important property is the number of passes the plate can make through the kiln before failure. The results of the experiment are summarized in the following Table.

TABLE V

| % MAGNESIUM ACETATE | % MONOCLINIC | AVERAGE NO. OF PASSES |
|---|---|---|
| 6.5 | 24.5 | 8.9 |
| 3.5 | 43.7 | 4.0 |

Clearly the plates with an average of 24.5% monoclinic zirconia survived more cycles than the plates with 43.7% monoclinic.

Thus as can be seen from the foregoing, a ceramic body having an excellent combination of high temperature properties is obtained.

It is apparent that there has been provided in accordance with this invention ceramic bodies formed from partially stabilized zirconia which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A ceramic foam body for use in high temperature applications which comprises a porous ceramic body formed from zirconia and characterized by the presence of from about 12% to about 80% by weight zirconia in a monoclinic phase and the balance essentially in a cubic phase at room temperature.

2. A ceramic body according to claim 1 wherein said foam body is further characterized by an open cell structure having a plurality of interconnected voids surrounded by a web of said zirconia.

3. A ceramic foam body for filtering molten metal which comprises a porous ceramic foam zirconia filter body, said ceramic foam filter body being characterized by the presence of from about 12% to about 80% by weight zirconia in a monoclinic phase and the balance essentially in a cubic phase at room temperature.

4. A ceramic foam body for use in high temperature kiln-furniture application which comprises a porous ceramic foam zirconia body, said porous ceramic foam body consisting of from about 12% to about 80% by weight zirconia in a monoclinic phase and the balance essentially in a cubic phase at room temperature.

5. A ceramic body according to claim 1 wherein said foam ceramic body is characterized by the presence of from about 15% to about 28% zirconia in a monoclinic phase and the balance essentially in a cubic phase at room temperature.

* * * * *

UNITED STATES PATENT AND TRADEMARK OFFICE
CERTIFICATE OF CORRECTION

PATENT NO. : 5,023,217

DATED : JUNE 11, 1991

INVENTOR(S) : RICHARD EVERHART ET AL.

It is certified that error appears in the above-identified patent and that said Letters Patent is hereby corrected as shown below:

COLUMN 8, CLAIM 1, LINE 2, INSERT --FOAM-- BETWEEN "CERAMIC" AND "BODY".

COLUMN 8, CLAIM 2, LINE 1, INSERT --FOAM-- BETWEEN "CERAMIC" AND "BODY".

Signed and Sealed this

Fifteenth Day of December, 1992

Attest:

DOUGLAS B. COMER

*Attesting Officer*   Acting Commissioner of Patents and Trademarks